US011979198B2

(12) United States Patent
Egbert

(10) Patent No.: US 11,979,198 B2
(45) Date of Patent: May 7, 2024

(54) METHOD AND SYSTEM FOR ENABLING REAL-TIME ADAPTIVE RADIO FREQUENCY TRANSMITTER OPTIMIZATION

(71) Applicant: BAYLOR UNIVERSITY, Waco, TX (US)

(72) Inventor: Austin Scott Egbert, Waco, TX (US)

(73) Assignee: BAYLOR UNIVERSITY, Waco, TX (US)

( * ) Notice: Subject to any disclaimer, the term of this patent is extended or adjusted under 35 U.S.C. 154(b) by 46 days.

(21) Appl. No.: 17/967,247

(22) Filed: Oct. 17, 2022

(65) Prior Publication Data

US 2023/0118051 A1   Apr. 20, 2023

Related U.S. Application Data

(60) Provisional application No. 63/256,001, filed on Oct. 15, 2021.

(51) Int. Cl.
*H04L 25/49* (2006.01)
*H04B 1/00* (2006.01)
(Continued)

(52) U.S. Cl.
CPC ........... *H04B 17/13* (2015.01); *H04B 1/0003* (2013.01); *H04B 1/04* (2013.01); *H04B 2001/0416* (2013.01)

(58) Field of Classification Search
CPC ........ H04B 1/0003; H04B 1/04; H04B 17/13; H04B 2001/0416; H04B 1/0458;
(Continued)

(56) References Cited

U.S. PATENT DOCUMENTS

| 8,412,135 B2* | 4/2013 | Kim | ..................... | H04W 52/283 |
| | | | | 455/127.5 |
| 9,362,891 B2* | 6/2016 | Man | ..................... | H04B 1/3838 |

(Continued)

FOREIGN PATENT DOCUMENTS

WO   2007/081705   7/2007

OTHER PUBLICATIONS

Notification of Transmittal of the International Search Report and the Written Opinion of the International Search Authority—The European Patent Office—dated Feb. 20, 2023 for PCT/US22/46872, 24 pages.

(Continued)

*Primary Examiner* — Khai Tran
(74) *Attorney, Agent, or Firm* — Jackson Walker LLP

(57) ABSTRACT

A disclosed radio frequency (RF) system, such as a cognitive radar, includes a software defined radio (SDR), an adaptive transmit amplifier, and a host computer. The system performs optimization operations including selecting an initial impedance as a load impedance for the RF device and iteratively performing image completion operations until a convergence criterion is satisfied. The image completion operations may include measuring a performance of the RF device to obtain a measured performance corresponding to the load impedance, storing the measured performance as a point on a measured load-pull contour image, performing a load-pull extrapolation to extrapolate, from the load impedance, a predicted optimal impedance, and saving the predicted impedance as the load impedance for a next iteration of the image completion operations. The convergence criterion may be satisfied when a predicted impedance matches one of the previously measured impedances.

20 Claims, 4 Drawing Sheets

(51) Int. Cl.
*H04B 1/04* (2006.01)
*H04B 17/13* (2015.01)

(58) Field of Classification Search
CPC ............ H04B 1/0483; H03F 2200/222; H03F 2200/387; H03H 7/38
USPC ........................................................ 375/297
See application file for complete search history.

(56) References Cited

U.S. PATENT DOCUMENTS

2021/0326725 A1* 10/2021 Payton ..................... H04K 3/94
2023/0156473 A1* 5/2023 Melodia .............. H04W 12/122
                                                                       726/23

OTHER PUBLICATIONS

Egbert, et al.. "Partial Load-Pull Extrapolation Using Deep Image Completion", IEEE, May 26, 2020, 5 pages.
Saini, et al., "Interpolation and Extrapolation Capabilities of Non-Linear Behavioural Models", IEEE, Dec. 1, 2011, 4 pages.
Egbert, et al.. "Extrapolation of Load-Pull Data: A Novel Use of GAN Artificial Intelligence Image Completion", IEEE, Nov. 1, 2022, pp. 4849-4856.
Egbert, et al. "Continuous Real-Time Circuit Reconfiguration to Maximize Average Output Power in Cognitive Radar Transmitters".

\* cited by examiner

METHOD AND SYSTEM FOR ENABLING REAL-TIME ADAPTIVE RADIO FREQUENCY TRANSMITTER OPTIMIZATION

CROSS REFERENCE TO RELATED APPLICATIONS

Pursuant to 35 USC § 119(e), this application claims benefit of and priority to U.S. Application No. 63/256,001, filed Oct. 15, 2021, referred to herein as the "Provisional Application", the entirety of which is incorporated by reference herein.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to adaptive radio frequency (RF) transmitters and, more specifically, real-time optimizations of RF transmitters.

Description of the Related Art

As the available wireless spectrum grows more crowded with increased usage from high bandwidth telecommunications applications, it becomes infeasible for many other users of wireless spectrum to continue operating with static, inflexible methods. Among these users are radar systems, which have historically had large sections of bandwidth reserved for their use. In order to adapt and coexist with new technology in a dynamically managed environment, next generation radars must be able to reconfigure and optimize their spectral configuration in real-time.

In 2009, then-Federal Communications Commission (FCC) chairman Julius Genachowski stated, "I believe that the biggest threat to the future of mobile in America is the looming spectrum crisis". The crisis he foresaw was an inability to provide enough spectrum for future wireless telecommunications applications and systems, such as for fifth-generation wireless (5G) technology. At the time, mobile data usage was expected to grow from 6 PB/mo in 2008 to 400 PB/mo in 2013. More recently, Ericsson has estimated that global mobile data usage will reach 226 EB/mo in 2026. To address this lack of spectrum availability, the National Broadband Plan of 2010 directed the FCC to auction off several regions of spectrum that had been previously allocated to other uses, and proposals of new reallocations are under continued development. While these auctions have helped to alleviate spectral pressure, the auction and reallocation process takes several years to complete, limiting this solution's usefulness to situations where the need for spectral shuffling can be recognized in advance.

It is important to note that spectral auctions on their own do little to provide a long-term solution to spectral congestion, as recognized by the President's Council of Advisors on Science and Technology (PCAST) in 2012. While PCAST argued that auctions of federal spectrum were unsustainable due to cost, time, and disruption of government missions, the issues do not stop there. In fact, as long as intermittent or infrequent spectrum applications (including various military and aerospace systems) exist, long-term, static allocations are fundamentally incompatible with the need for high spectrum utilization (ratio of occupied spectrum to total spectrum). Under the traditional approach for spectrum allocation, spectrum utilization studies reveal that densely populated areas such as New York City, Chicago, and Dublin may utilize as little as 13-17% of the available spectrum at peak times and that utilization within a given band often reflects the nature of the applications assigned to that band. See, e.g., Mark A. McHenry et al., Spectrum Occupancy Measurements Location 4 of 6; Republican National Convention, New York City, New York Aug. 30, 2004-Sep. 3, 2004 Revision 2 (Shared Spectrum Co. Aug. 15, 2005) (reporting TV band utilization of up to 77%, cellular band utilization of up to 46%, and utilization within various radar or aerospace application bands between 0.2 and 5%). Clearly, not all wireless applications are equal in terms of spectrum utilization. However, traditional application-based spectrum allocation (where specific portions of the spectrum are assigned for specific uses) ignores this utilization disparity, resulting in some bands dealing with overcrowding while others are severely underused by comparison.

In the field of high power RF transmitters, including radar transmitters, techniques for optimizing transmit configurations, including, without limitation, carrier frequency, bandwidth, and waveform type, using adjustable amplifier matching networks have been described. Generally however, such techniques have been too computationally intensive to be suitable for use cases requiring real-time optimizations.

BRIEF SUMMARY OF THE INVENTION

Disclosed subject matter addresses the inability of conventional RF transmitters to dynamically optimize their transmit configurations in real-time by presenting a faster method for optimizing the transmit configuration of RF amplifiers using a software-defined radio (SDR) configured to perform a load-pull extrapolation based search to identify the optimal load impedance rapidly.

A more efficient approach for spectrum management involves the use of dynamically allocating spectrum resources "on the fly" according to the users within a given environment. Various spectrum management approaches discussed in the prior art address benefits and challenges faced in alternate arrangements. Some of these approaches have begun to see real-world application under the Citizens Broadband Radio Service (CBRS), with additional spectrum sharing options currently under consideration as part of America's Mid Band Initiative. With the introduction of phased array antenna technology, additional control over transmission direction enables additional dimensions of spectral control, further aiding the potential for efficient use of spectrum resources.

In order to take full advantage of the flexibility afforded by a dynamic allocation system, devices must be able to reconfigure themselves for efficient operation in the available bands in a timely manner. For high-power applications such as radar or cellular base stations, this reconfiguration requires optimization of the system's transmit chain for optimal performance at the selected frequency. Previous work has been done to develop optimization methods for radar transmit amplifiers using adjustable load impedance tuners, but the measurement techniques used fall short of real-time operation, with individual measurement sets requiring multiple seconds to complete. Active load-pull systems have demonstrated significant improvements in tuning time, but they are not practical for use in deployed systems. Meanwhile, software-defined radios (SDRs) have been used to demonstrate measurement techniques. Subject matter disclosed herein employs SDRs to implement load-pull extrapolations to achieve dramatic improvements in the search for an optimal configuration. A predicted optimal impedance is used to guide the search, alternating between selecting a region of interest via extrapolation and acquiring new measurements in the region of interest to identify a new predicted optimal impedance. The efficiency of this alternating process depends primarily on the component reconfiguration period and the computational requirements of the adaptation algorithm.

Generally, high-power, mechanically actuated impedance tuners are not able to adapt quickly enough to provide and maintain optimal performance for rapidly adapting RF systems. Cognitive radars, which can craft unique radar pulses designed to fit in the existing spectral environment, are an example of such a system. Typically, a radar's pulse repetition interval (PRI) may range from 10 μs to 100 μs, while a fast mechanically actuated impedance tuner may take 40 ms to 100 ms per tuning operation. As a result, such tuners can only be used to optimize the average performance of such radars over the course of many pulses. Unfortunately, however, optimization generally requires consideration of multiple transmit configurations, each of which must be evaluated at multiple impedances during each search iteration. While the measurement period can be adjusted to better accommodate this reality, the vast majority of measurements will likely provide duplicate information because many transmit configurations exhibit similar impacts on the transmit amplifier (such that they could be treated as identical during the search process). It is therefore reasonable to consider a grouping strategy that essentially treats the transmit configurations within each group as equivalent, greatly reducing the number of measurements required during optimization However, it is difficult to obtain enough information during the optimization process to confirm the equivalency of disparate transmit configurations. Given the generally regular nature of amplifier performance contours on the Smith Chart, it is possible to use partial knowledge of the circuit performance associated with a given transmit configuration to extrapolate a more complete understanding that can be used to find transmit configurations with substantially identical performance characteristics. Disclosed subject matter, in at least some respects, applies deep learning to generative adversarial networks (GAN) to enable a highly efficient image completion using extrapolated load-pull information. Such techniques provide a viable optimization solution for adaptive RF transmitters and may be additionally suitable for jump-starting initialization of other algorithms or accelerating load-pull processes generally by greatly reducing the number of evaluated impedances required to produce accurate load-pull contours, with as few as six measurements being required in many cases.

In one aspect, a disclosed radio frequency (RF) device system includes a software defined radio (SDR), an adaptive transmit amplifier, and a host computer communicatively coupled to the SDR and the adaptive transmit amplifier. The RF device itself may be a cognitive radar. The host computer includes a central processing unit and a computer readable memory including processor executable instructions that, when executed by the processor cause the system to perform optimization operations including selecting an initial impedance as a load impedance for the RF device and iteratively performing image completion operations until a convergence criterion is satisfied. The image completion operations may include measuring a performance of the RF device to obtain a measured performance corresponding to the load impedance, storing the measured performance as a point on a measured load-pull contour image, performing a load-pull extrapolation to extrapolate, from the load impedance, a predicted optimal impedance, and saving the predicted impedance as the load impedance for a next iteration of the image completion operations. The convergence criterion may be satisfied when a difference between the predicted impedance and a closest previously measured load impedance is less than a predetermined threshold. In embodiments in which impedances are represented as pixels in an image, the convergence criterion may be satisfied when a predicted impedance matches one of the previously measured impedances.

The load-pull extrapolation may be implemented as a gradient-based image completion process applied to a generative adversarial network (GAN) trained on known load-pull contours. The load-pull contour image may correspond to an array of image pixels wherein each pixel represents a corresponding load impedance. The image completion operations may include measuring a performance of the RF device at one or more additional impedances and adding a point corresponding to each of the one ore additional impedance to the load-pull contour image. The predicted impedance may correspond to a first image pixel and the one or more additional impedances may correspond to one or more additional pixels wherein the additional pixels are selected based, at least in part, on proximity to the first image pixel. For example, the one or more additional pixels may comprise one or more pixels selected from a group of pixels adjacent to and surrounding the first pixel.

The GAN may include a generator network and a discriminator network and performing the load-pull extrapolation may include generating, with the generator network, a predicted load-pull contour image, determining a degree of agreement between the points of the measured load-pull contour image and corresponding points of the predicted load-pull contour image, and searching for a generator network input producing a predicted load-pull contour image that minimizes a loss metric. The GAN may be implemented as a Wasserstein GAN and the discriminator network may comprise a critic network. In such embodiments, the loss metric may include a contextual loss component indicative of a similarity between the generated load-pull contour image and the points of the measured load-pull contour image and a perceptual loss component indicative of a degree of difference between the generated load-pull contour image a trained dataset.

DETAILED DESCRIPTION

Figure 1:
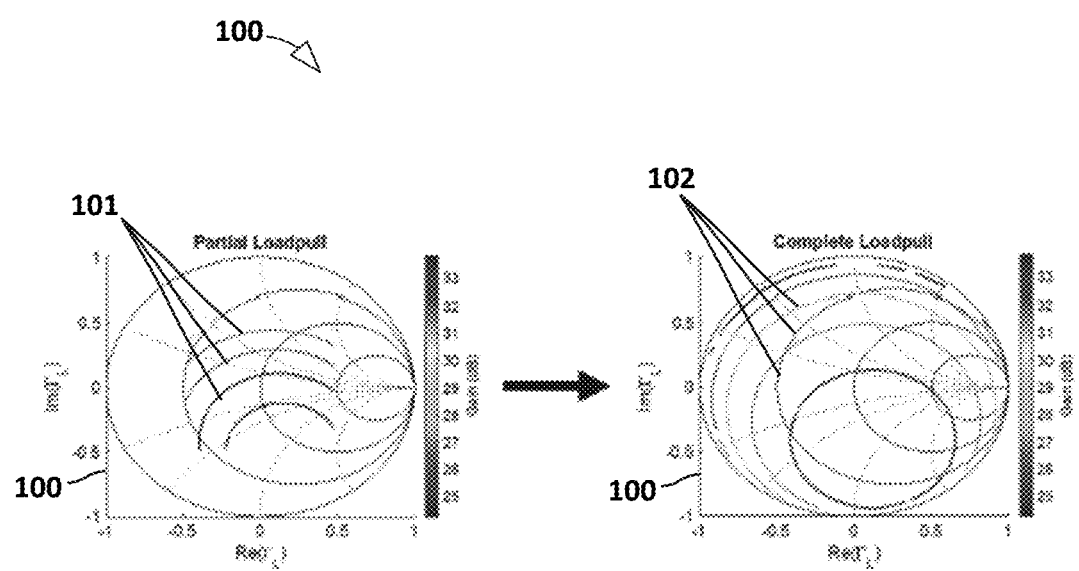
FIG. 1 is a graphical depiction of the determination of complete load-pull contours from partial contour information.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure.

It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure.

Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally.

The order of disclosed steps can occur in a variety of sequences unless otherwise specifically limited. Disclosed steps can be combined with other steps, interlineated with the stated steps, and/or split into multiple steps. Similarly, disclosed elements may be described functionally and can be embodied as separate components or can be combined into components having multiple functions. Some elements may be nominated by a device name for simplicity and would be understood to include a system of related components, known to those with ordinary skill in the art, which may or may not be specifically described.

Structural elements may be disclosed via examples, provided in the description and figures, that perform various functions. The examples are non-limiting in shape, size, and description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments may be disclosed that use various element numbers for like elements.

Overview. The Provisional Application includes subject matter disclosing various systems, techniques, and applications pertaining to real-time optimization of cognitive radar transmitters. This subject matter covers topics including determining spatial-spectral transmission constraints, real-time performance evaluations of RF devices using software-defined radios (SDRs), real-time optimization of cognitive radar transmit amplifiers, effects of impedance tuning on range-Doppler processing, and, partial load-pull extrapolation via deep image completion. Although there is overlap among these topics, the present application is primarily directed to real-time optimization of adaptive RF transmit amplifiers and image completion using load-pull extrapolation.

Techniques for optimizing the mean performance of an RF transmit circuit, as disclosed in the Provisional Application, observe each transmit configuration multiple times per impedance value. This approach can require an undesirably large number of observations, particularly in highly variable or complex spectral situations. Many transmit configurations, however, produce performance contours with respect to impedance that are sufficiently similar to be used interchangeably during a search, with negligible impact on the search's ability to converge to an optimal solution. Grouping of effectively equivalent transmit configurations beneficially reduces the number of transmit configurations and improves efficiency of the optimization process. Unfortunately, the amount of configuration measurement data that must be obtained to confirm, with a desired certainty, the effective equivalence of any two transmit configurations can also be burdensome. If, however, comparisons of transmit configurations across dissimilar impedances could be made, it would greatly improve the benefit of configuration grouping, as the amount of data required to reach an equivalence conclusion during system operation would be greatly reduced.

Performance data for disparate configurations and impedances may be compared by extrapolating the performance of each configuration to a common impedance. Using this load-pull extrapolation technique, a full set of load-pull contours can be derived from an incomplete dataset. FIG. 1 illustrates a complete set of load pull contours 102, depicted on a Smith chart 100, derived from an incomplete dataset 101.

Figure 2:
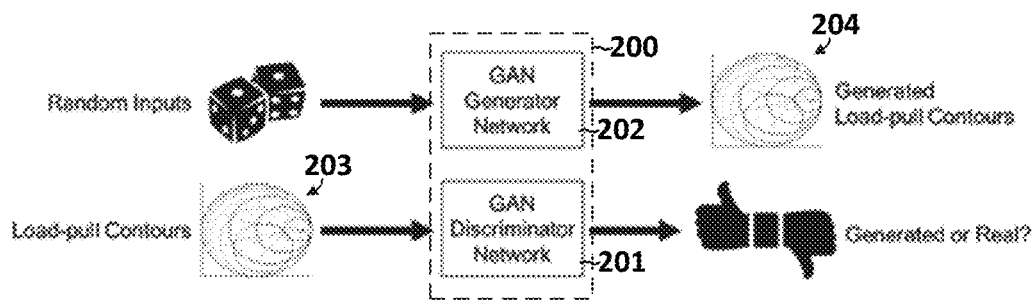
FIG. 2 is a graphical depiction of generator network and discriminator network functions for a GAN configured for use in conjunction with disclosed image completion features.

The objective graphically depicted in FIG. 1, i.e., deriving complete load-pull contours from incomplete contours suggests an image completion problem in which each load-pull contour is represented as a group of pixels in an image of a Smith chart plotting a particular value of a performance parameter, e.g., output power, gain, etc., as a function of the normalized real and imaginary components of the set of load impedances that produce the applicable value of the performance parameter. In such images, each pixel of the image corresponds to a particular impedance. In at least some embodiments, a deep learning image completion process is employed to achieve the depicted objective. In an exemplary implementation, a gradient-based deep learning image completion process is applied to a generative adversarial network (GAN) trained in accordance with known amplifier load-pull contours. The training data may be obtained from measurements or simulations of linear or non-linear amplifiers. As depicted in FIG. 2, a GAN 200 may include a discriminator network 201 and a generator network 202 trained with opposing goals. Discriminator network 201 may be trained to recognize whether a given load-pull contour image 203 depicts real load-pull contours, i.e., load-pull contours included in the training data, or generated load-pull contours, i.e., contours produced by generator network 202, being careful not to overfit the training data. In contrast, generator network 202 may be trained to produce generated load-pull contour images 204 that discriminator network 201 will classify as a valid set of load-pull contours. In at least some embodiments, discriminator network 201 and generator network 202 are trained in an alternating manner to allow both networks to adapt to weaknesses in the other's behavior.

Figure 3:
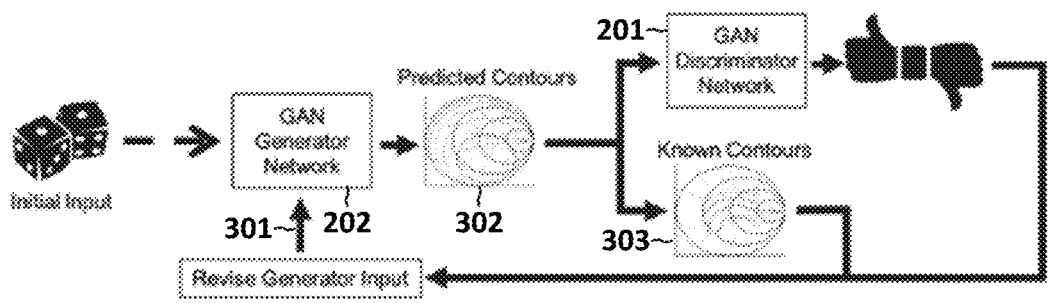
FIG. 3 is a graphical depiction of the generator network and discriminator network of FIG. 3 configured to perform image completion in accordance with disclosed teachings.

Using a suitably-trained GAN 200, image completion can be performed in a manner suggested in FIG. 3, by iteratively searching for an input 301 to generator network 202 that produces predicted contours 302 that closely agree with known contours 303 of an image being completed. As the GAN 200 is pre-trained prior to image completion, this approach provides a good basis for quickly evaluating an unknown device. In at least some embodiments, GAN 200 may be implemented as a Wasserstein GAN (WGAN), in which a predetermined distance, referred to as a Wasserstein distance, is used as a loss metric when training generator network 202 and discriminator network 201, which may be referred to as the critic network in this context. Using the Wasserstein distance may avoid metric saturation that can occur when one of the networks performs too well, e.g., discriminator network 201 is never wrong. Avoiding this saturation greatly improves the stability and robustness of the network training process by ensuring that gradient calculations used to update generator network 202 do not vanish if discriminator network 201 performs too well, and it helps prevent generator network 202 from only learning a few specific images capable of fooling discriminator network 201.

Figure 4:
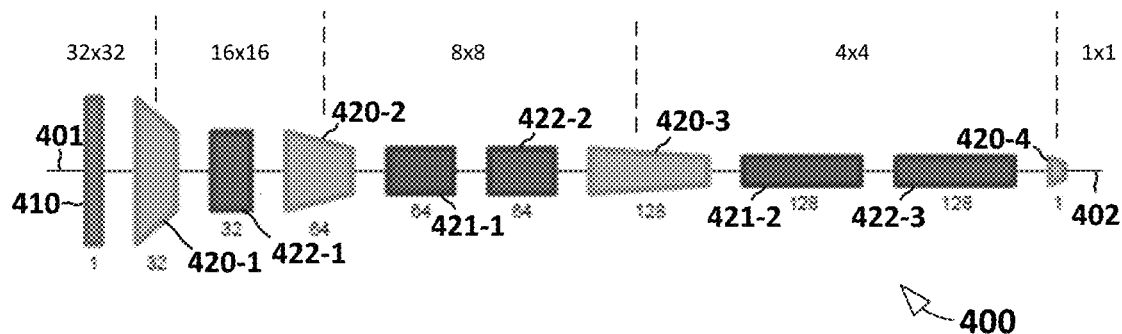
FIG. 4 illustrates an exemplary network topology for a load-pull discriminator network.
Figure 5:
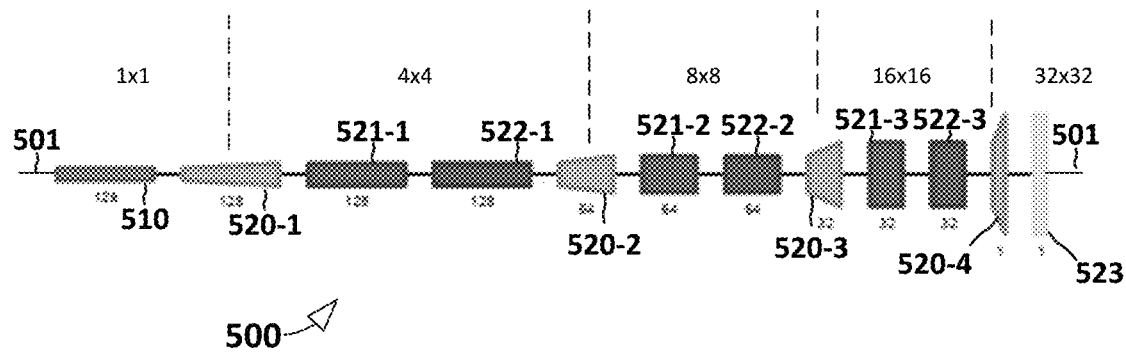
FIG. 5 illustrates an exemplary network topology for a load-pull generator network.

FIG. 4 illustrates an exemplary discriminator network topology 400 for discriminator network 201 and FIG. 5 illustrates an exemplary generator network topology 500 for generator network 201. The illustrated discriminator network topology 400 operates on a 32×32 pixel load-pull image 401 and produces a distance 402, which is a single value indicating a magnitude of a distance between the input image and the learned set of valid images. The illustrated discriminator network topology 402 includes an input layer 410, four 2D convolution layers 420-1, 420-2, and 420-3, and 420-4 and three leaky rectified linear unit activation functions 422-1, 422-2, and 422-3. The outputs of 2D convolution layers 420-2 and 420-3 are layer-normalized via layer normalization functions 422-1 and 422-2 respectively. The generator network topology 500 illustrated in FIG. 5 operates on a 128-element initialization vector 501 and produces a synthesized 32×32 pixel greyscale load-pull image 502. An input layer 510 receives initialization vector 501 and the depicted topology includes four 2D convolution transpose layers 520-1, 520-2, 520-3, and 520-4 and three leaky ReLUs 522-1, 522-2, and 522-3. The outputs of 2D convolution transpose layers 520-1, 520-2, and 520-3 are batch normalized via batch normalization functions 521-1, 521-2, and 521-3 respectively. A hyperbolic tangent activation layer 523 provides the final scaling of the network output.

In an exemplary implementation, training data is generated via simulated output power contours for 100,000 randomly generated sets of amplifier scattering-parameters (S-parameters), representing the linear characteristics of the amplifiers. Accordingly, the simulated contours represent linear device performance. In some embodiments, it may be desirable to provide additional training data for large-signal operation by performing load-pull simulations using existing nonlinear device models across a variety of settings (frequency, bias conditions, input power, etc.). In other embodiments, the linear training data may be sufficient.

As suggested previously, the goal of image completion is to find an input $\hat{z}$ to the generator network that produces an image $G(\hat{z})$ that is similar to a known partial image $\hat{x}$ and fits the overall target dataset. To complete an image, a mask M is defined to encode the portion of the full image provided by $\hat{x}$. The mask is specified as $$M(n) = \begin{cases} 1, & \hat{x}(n) \text{ is valid} \\ 0, & \hat{x}(n) \text{ is invalid} \end{cases} \quad \text{(Eq. 1)}$$

where n specifies pixels within the image. This mask indicates portions of the generated image to consider when comparing the generated image to the provided partial image.

In an exemplary embodiment, two loss metrics, contextual loss and perceptual loss, are used to determine the quality of $G(\hat{z})$. Contextual loss, which indicates the degree of similarity between the generated image and the provided partial image, is defined as:

$$L_{context}(\hat{z}) = \|M*G(\hat{z}) - M*\hat{x}\|_1 \quad \text{(Eq. 2)}$$

Perceptual loss, which describes how closely the generated image resembles members of the trained dataset according to the critic network C( ) is defined as:

$$L_{percept}(\hat{z}) = \log(1 - C(G(\hat{z}))) \quad \text{(Eq. 3)}$$

The two losses may be combined with a hyperparameter λ that weights the relative importance of the two metrics.

For purposes of the present disclosure, a value of 1 is selected for λ. Accordingly, the total loss L(ẑ) is:

$$L(\hat{z}) = L_{context}(\hat{z}) + \lambda L_{percept}(\hat{z}) \quad \text{(Eq. 4)}$$

In terms of Eq. 4, the goal of optimization is to find some ẑ that minimizes L(ẑ). This is a stochastic gradient-based optimization problem that may be solved with any of various suitable algorithms that will be familiar to those of ordinary skill. An exemplary algorithm for identifying a solution for Eq. 4 may include elements described in D. P. Kingma, "Adam: A Method for Stochastic Optimization," 3rd International Conference on Learning Representations (Submitted: Dec. 22, 2014, Published: May 5, 2015). Each extrapolated load-pull contour set may be the result of a fixed number of iterations (e.g., 1000) or a dynamic number of iterations of the applicable algorithm. In the dynamic case, the number of iterations may be determined by the behavior of the loss functions over the completed iterations.

Figure 6:
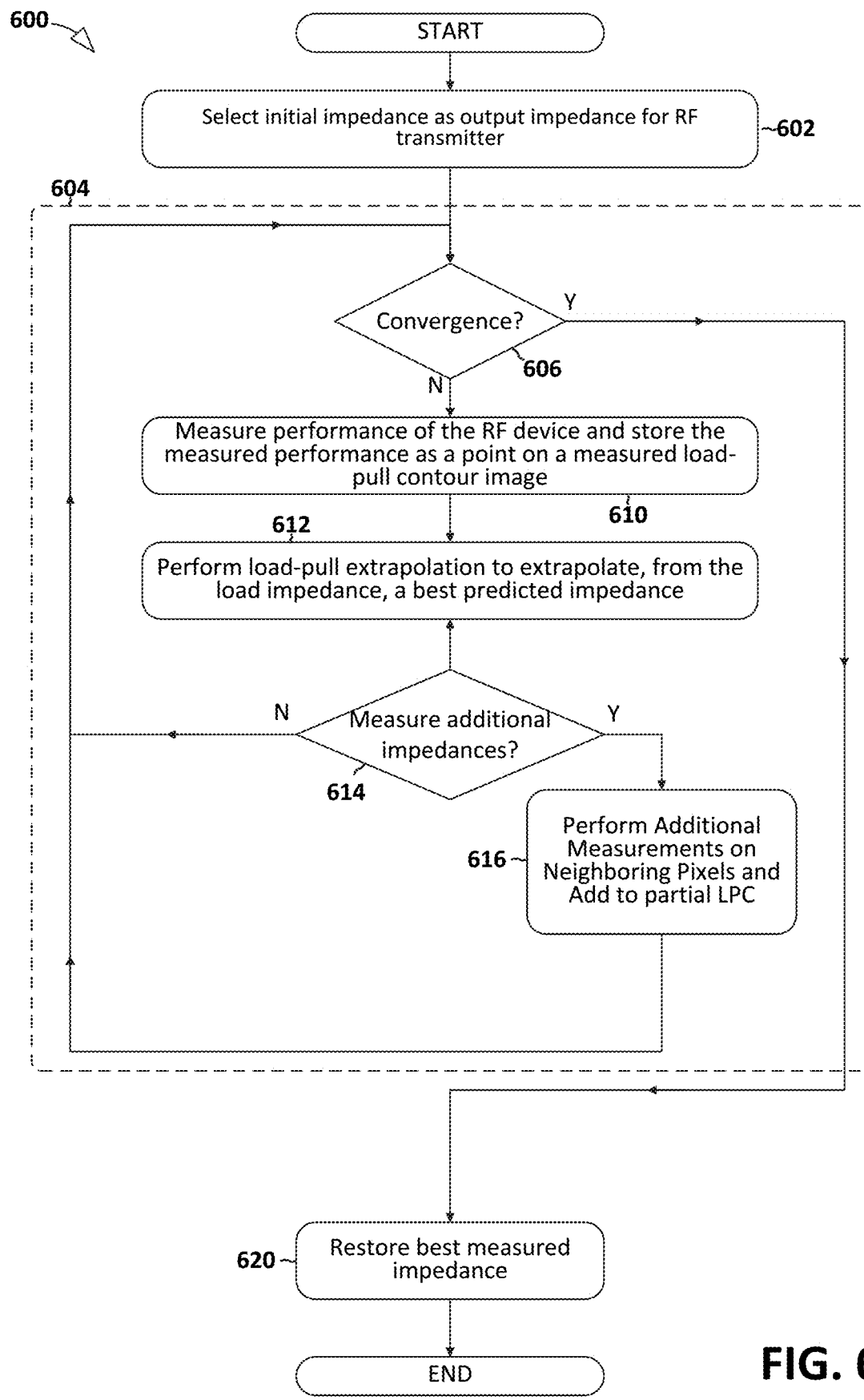
FIG. 6 illustrates a flow diagram of an optimization method using load-pull extrapolation.

Referring now to FIG. 6, a flow diagram illustrates an optimization method 600 employing iterative load-pull extrapolation. The illustrated method 600 embodies a "maximum addition" technique in which the best predicted impedance from each iteration of a load-pull extrapolation is chosen for measurement and its performance is added to a load-pull contour dataset that represents a load-pull contour image being constructed.

As depicted in FIG. 6, the illustrated method 600 begins with an initial operation 602 during which an initial impedance is selected as the output impedance for an RF transmitter. The illustrated method then enters an iterative loop 604 that begins with a convergence check (operation 606) in which a specified convergence criterion is evaluated against a predetermined threshold. In at least one embodiment, the convergence criterion assesses whether the most recently identified best predicted impedance matches an impedance that has already been measured. If convergence has not been reached, the illustrated method measures (operation 610) a performance of the RF device and stores the measured performance as a point on a load-pull contour image referred to herein as the measured load-pull contour image. The illustrated method 600 may then perform (operation 612) a load-pull extrapolation to identify a best predicted impedance.

In at least some embodiments, it may be beneficial or otherwise desirable to perform one or more additional measurements within loop 604 such that each iteration of loop 604 adds more than one data point to the measured load-pull contour image being constructed. The illustrated method 600 includes a determination (operation 614) of whether to measure (operation 616) one or more additional impedances during the current iteration of loop 604. Measuring additional data points is more likely to be beneficial if the additional data point(s) are associated with impedances that can be identified with little or no appreciable delay and that are likely to exhibit performance contours similar to the currently applied impedance. For a pixel based load-pull contour image, both of these conditions can be met by selecting additional impedances based on a pixel proximity. As an illustrative example, an implementation may perform a total of five measurements during each iteration of loop 604 where the five measurements correspond to the best predicted impedance and the impedances corresponding to pixels immediately north, south, east, and west of the active pixel, i.e., the pixel corresponding to the current best predicted impedance. Other implementations may select and measure more, fewer, and/or different additional pixels.

If the convergence check (operation 606) indicates that the applicable convergence criterion is satisfied, the method 600 illustrated in FIG. 6 applies (operation 620) the best measured impedance to the load-pull contour image and the method terminates.

Figure 7:
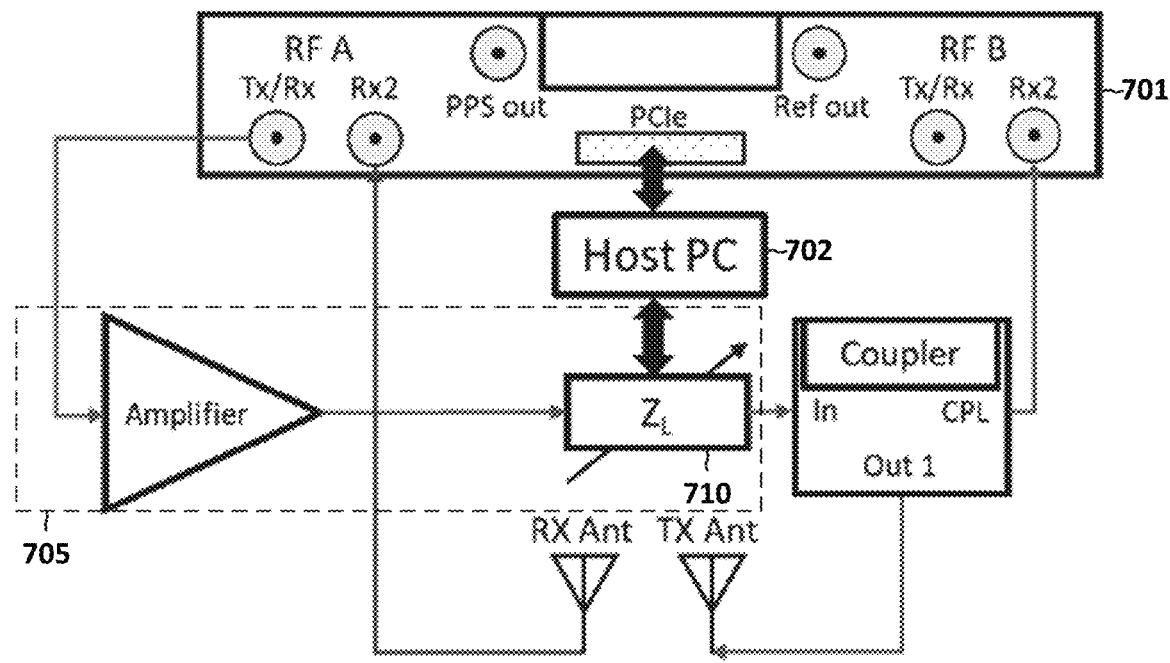
FIG. 7 illustrates an exemplary radar system suitable for use in conjunction with the disclosed subject matter for real time optimization.

Referring now to FIG. 7, a cognitive radar system 700 suitable for implementing disclosed real-time optimization features is depicted. The illustrated radar system 700 includes as software defined radio 701 and an adaptive transmit amplifier 705 both communicatively coupled to a host computer 702. Adaptive transmit amplifier 705 includes an amplifier 701 and a configurable or variable load impedance 710. The software defined radio 701 may be implemented with any of various suitable commercially distributed SDRs including, as an illustrative example, a USRP X310 from Ettus Research. In at least one embodiment, host computer 702 includes software instructions that, when executed, perform real-time optimizations described herein.

Figure 8:
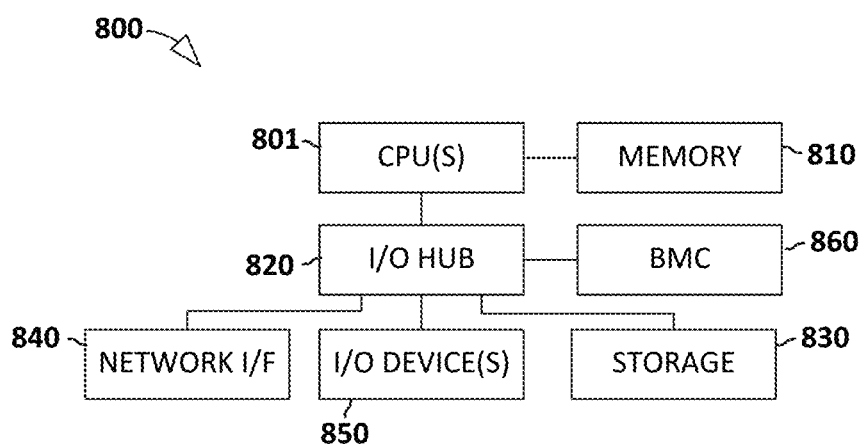
FIG. 8 illustrates an exemplary host computer suitable for use in conjunction with subject matter disclosed in FIGS. 1-7.

Referring now to FIG. 8, any one or more of the elements illustrated in FIG. 1 through FIG. 2 may be implemented as or within an information handling system exemplified by the information handling system 800 illustrated in FIG. 8. The illustrated information handling system includes one or more general purpose processors or central processing units (CPUs) 801 communicatively coupled to a memory resource 810 and to an input/output hub 820 to which various I/O resources and/or components are communicatively coupled. The I/O resources explicitly depicted in FIG. 8 include a network interface 840, commonly referred to as a NIC (network interface card), storage resources 830, and additional I/O devices, components, or resources 850 including as non-limiting examples, keyboards, mice, displays, printers, speakers, microphones, etc. The illustrated information handling system 800 includes a baseboard management controller (BMC) 860 providing, among other features and services, an out-of-band management resource which may be coupled to a management server (not depicted). In at least some embodiments, BMC 860 may manage information handling system 800 even when information handling system 800 is powered off or powered to a standby state. BMC 860 may include a processor, memory, an out-of-band network interface separate from and physically isolated from an in-band network interface of information handling system 800, and/or other embedded information handling resources. In certain embodiments, BMC 860 may include or may be an integral part of a remote access controller (e.g., a Dell Remote Access Controller or Integrated Dell Remote Access Controller) or a chassis management controller.

Other and further embodiments utilizing one or more aspects of the inventions described above can be devised without departing from the disclosed invention as defined in the claims. For example, some of the steps and teachings could be combined or arranged in difference sequences and other variations that are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. A method for optimizing a transmit configuration of an adaptive radio frequency (RF) device, the method comprising:
   selecting an initial impedance as a load impedance for the RF device;
   iteratively performing image completion operations until a convergence criterion is satisfied, wherein the image completion operations include:
      measuring a performance of the RF device to obtain a measured performance corresponding to the load impedance;
      storing the measured performance as a point on a measured load-pull contour image;
      performing a load-pull extrapolation to extrapolate, from the load impedance, a predicted optimal impedance; and
      saving the predicted impedance as the load impedance for a next iteration of the image completion operations;
   wherein the convergence criteria is satisfied when a difference between the predicted impedance and a closest previously measured load impedance is less than a predetermined threshold.

2. The method of claim 1, wherein performing the load-pull extrapolation comprises applying a gradient-based image completion process to a generative adversarial network (GAN) trained on known load-pull contours.

3. The method of claim 2, wherein the load-pull contour image comprises an array of image pixels wherein each pixel represents a corresponding load impedance.

4. The method of claim 3, wherein the image completion operations include:
   measuring a performance of the RF device at one or more additional impedances; and
   adding a point corresponding to each of the one or additional impedance to the load-pull contour image.

5. The method of claim 4, wherein the predicted impedance corresponds to a first image pixel and wherein the one or more additional impedances correspond to one or more additional pixels wherein the pixels are selected based, at least in part, on proximity to the first image pixel.

6. The method of claim 5, wherein the one or more additional pixels comprise one or more image pixels selected from a group of pixels adjacent to and surrounding the first image pixel.

7. The method of claim 2, wherein the GAN includes a generator network and a discriminator network and wherein performing the load-pull extrapolation comprises:
   generating, with the generator network, a predicted load-pull contour image;
   determining a degree of agreement between the points of the measured load-pull contour image and corresponding points of the predicted load-pull contour image; and
   searching for a generator network input producing a predicated load-pull contour image that minimizes a loss metric.

8. The method of claim 7, wherein the GAN comprises a Wasserstein GAN and the discriminator network comprises a critic network, and wherein the lost metric includes:
   a contextual loss component indicative of a similarity between the generated load-pull contour image and the points of the measured load-pull contour image; and
   a perceptual loss component indicative of a degree difference between the generated load-pull contour image a trained dataset.

9. The method of claim 2, wherein the GAN is trained exclusively on contours corresponding to linear device operation.

10. The method of claim 2, wherein the RF device comprises a cognitive radar device.

11. A radio frequency (RF) device system, comprising:
   a software defined radio (SDR);
   an adaptive transmit amplifier; and
   a host computer communicatively coupled to the SDR and the adaptive transmit amplifier, wherein the host computer includes a central processing unit and a computer readable memory including processor executable instructions that, when executed by the processor cause the system to perform optimization operations including:
      selecting an initial impedance as a load impedance for the RF device;
      iteratively performing image completion operations until a convergence criterion is satisfied, wherein the image completion operations include:
         measuring a performance of the RF device to obtain a measured performance corresponding to the load impedance;
         storing the measured performance as a point on a measured load-pull contour image;
         performing a load-pull extrapolation to extrapolate, from the load impedance, a predicted optimal impedance; and
         saving the predicted impedance as the load impedance for a next iteration of the image completion operations;
      wherein the convergence criteria is satisfied when a difference between the predicted impedance and a closest previously measured load impedance is less than a predetermined threshold.

12. The RF device of claim 11, wherein performing the load-pull extrapolation comprises applying a gradient-based image completion process to a generative adversarial network (GAN) trained on known load-pull contours.

13. The RF device of claim 12, wherein the load-pull contour image comprises an array of image pixels wherein each pixel represents a corresponding load impedance.

14. The RF device of claim 13, wherein the image completion operations include:
   measuring a performance of the RF device at one or more additional impedances; and
   adding a point corresponding to each of the one or additional impedance to the load-pull; contour image.

15. The RF device of claim 14, wherein the predicted impedance corresponds to a first image pixel and wherein the one or more additional impedances correspond to one or more additional pixels wherein the pixels are selected based, at least in part, on proximity to the first image pixel.

16. The RF device of claim 15, wherein the one or more additional pixels comprise one or more image pixels selected from a group of pixels adjacent to and surrounding the first image pixel.

17. The RF device of claim 12, wherein the GAN includes a generator network and a discriminator network and wherein performing the load-pull extrapolation comprises:
   generating, with the generator network, a predicted load-pull contour image;
   determining a degree of agreement between the points of the measured load-pull contour image and corresponding points of the predicted load-pull contour image; and searching for a generator network input producing a predicated load-pull contour image that minimizes a loss metric.

18. The RF device of claim 17, wherein the GAN comprises a Wasserstein GAN and the discriminator network comprises a critic network, and wherein the lost metric includes:
   a contextual loss component indicative of a similarity between the generated load-pull contour image and the points of the measured load-pull contour image; and
   a perceptual loss component indicative of a degree difference between the generated load-pull contour image a trained dataset.

19. The RF device of claim 12, wherein the GAN is trained exclusively on contours corresponding to linear device operation.

20. The RF device of claim 12, wherein the RF device comprises a cognitive radar device.

* * * * *